June 23, 1964 H. D. JONES, JR., ETAL 3,138,289
APPARATUS FOR TERMINATING THE FLOW OF METERED MATERIALS
Filed Jan. 25, 1961 4 Sheets-Sheet 1

INVENTORS
HAROLD D. JONES, JR.
EDWIN R. STURDIVANT
BY
Harold D Jones Jr
ATTORNEY

INVENTORS
HAROLD D. JONES, JR.
EDWIN R. STURDIVANT
BY
ATTORNEY

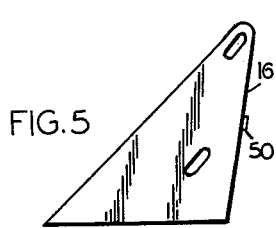
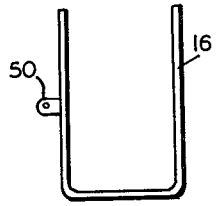
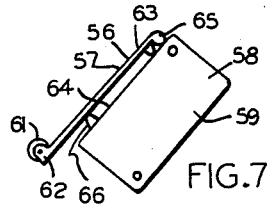
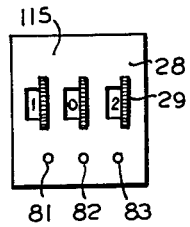
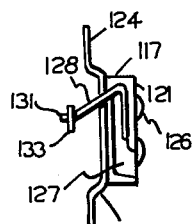
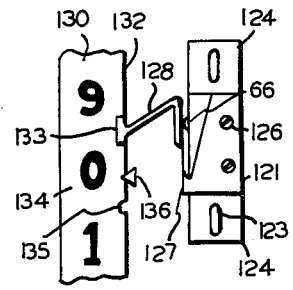
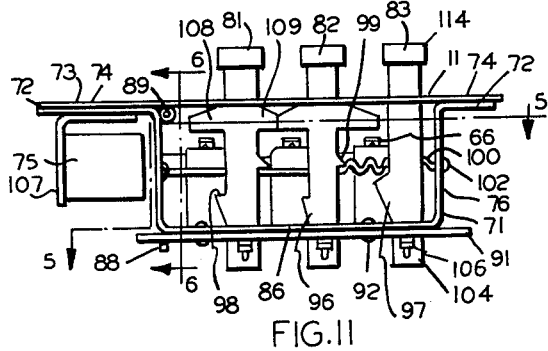
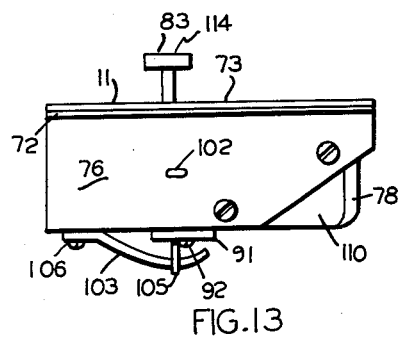
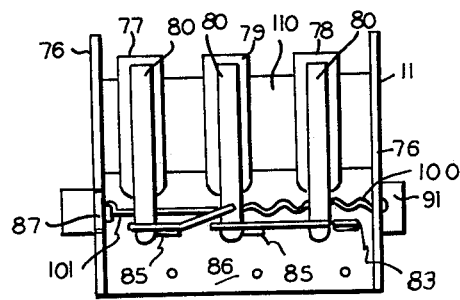
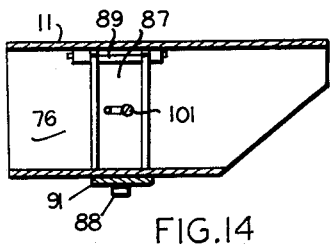
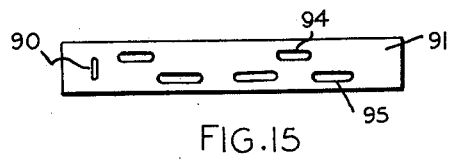

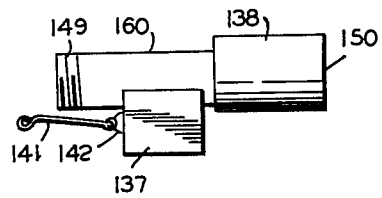
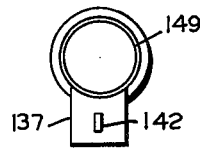
FIG.16    FIG.17
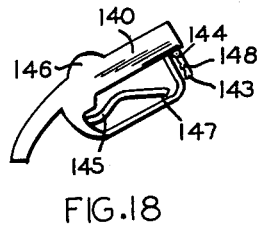
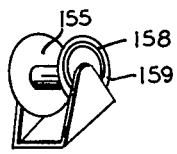
FIG.18    FIG.19
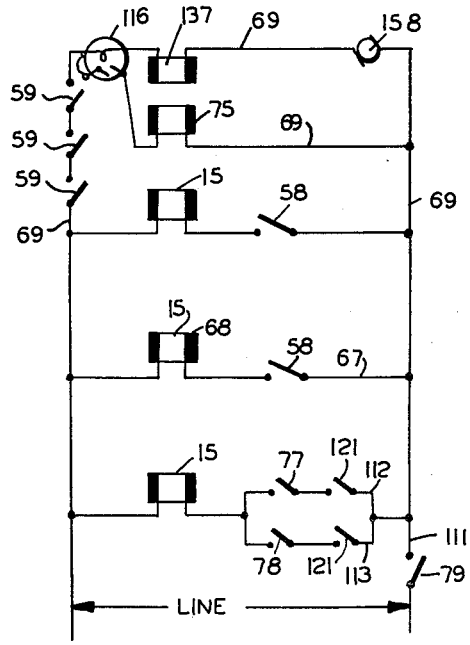
FIG.20

_United States Patent Office_ 3,138,289
Patented June 23, 1964

3,138,289
APPARATUS FOR TERMINATING THE FLOW OF METERED MATERIALS
Harold D. Jones, Jr., 1317 William-Oliver Bldg., Atlanta, Ga., and Edwin R. Sturdivant, 3848 N. Druid Hills Road, Decatur, Ga.
Filed Jan. 25, 1961, Ser. No. 84,840
1 Claim. (Cl. 222—20)

This invention relates to apparatus for terminating the flow of metered materials which can be pre-set to terminate the flow of continuously metered material when a specific amount of the material has been delivered from one point to another. The specific embodiment of the apparatus which is described herein is a device for use at gasoline stations which is pre-set to monitor the delivery by a gasoline pump of a specific volume or total cost of gasoline and which, without further attention from service station personnel, terminates the delivery of gasoline when the pre-set amount of gasoline has been delivered.

It has long been realized that a substantial saving in the employee time required to dispense gasoline at service stations would result in an improved utilization of service station manpower and lower operating costs. This realization has resulted in service station gasoline pumps which have high pumping rates and which can be locked in operation to automatically discontinue pumping when the automobile gasoline tank reaches a full condition. The latter feature in no way, and the former feature only partially, answers the problem of the demand placed upon employee time by a customer request for less than a full tank of gasoline. Thus, even with modern gasoline pumps, many customer service requests require an attendant to more or less continuously monitor the gasoline pumping operation to avoid an overrun and the attendant cannot devote himself to servicing the customer's other needs or to servicing other customers while the gasoline pump is in operation.

Numerous attempts have been made to provide a device which would free a service station attendant from pumping duties under all circumstances and permit the attendant to check the customer's automobile or attend to the needs of another customer. However, most of the devices which have resulted from these attempts have been closely associated with the internal mechanism of the gasoline pump and cannot be readily installed on existing pumps or incorporated into new pumps at the factory without substantial changes in the internal mechanism of the pumps.

The apparatus disclosed herein provides a means for presetting and monitoring by volume or cost the amount of gasoline pumped into an automobile gasoline tank or other container and for terminating the pumping of gasoline when the pre-set amount of gasoline has been delivered to the customer. It may be readily attached to or removed from existing gasoline pumps without significant modifications or changes in the structural characteristics or performance of the pumps. Moreover, it may be factory installed in new pumps in the same manner as on existing pumps or in a modified form making it an integral or internal part of the new pump.

Among the other features of the apparatus described herein are that it does not require adjustments to take into consideration changes in gasoline price and that the pre-set amount of gasoline to be delivered is readily set into the apparatus by simply moving counting wheels independently in either direction. Moreover, a positive acting cut-off mechanism is provided. This cut-off mechanism will positively and effectively discontinue the pumping operation in response to an indication from the counting mechanism that the pre-set amount of gasoline has been delivered. Significantly, this discontinuing of the pumping operation is accomplished without any interference with the internal mechanism of the gasoline pump and its various resetting control devices. Thus, even after pumping has been automatically discontinued because the pre-set amount of gasoline has been delivered, the service station attendant can return to the pump and add additional gasoline in any desired amount either manually or by resetting the apparatus described herein.

These and other features of the invention will be more clearly understood from the following detailed description and the accompanying drawings in which like characters designate corresponding parts in all figures and in which:

FIGURE 5 is a side elevational view of the micro-switch support used in the counting unit.

FIGURE 6 is a rear elevational view of the micro-switch support shown in FIGURE 5 and shows the contour and location of the pawl spring tab.

FIGURE 7 is a side elevational view of an advancing or output micro-switch adapted for use in the micro-switch support of FIGURE 5 by having an actuating lever mounted thereon.

FIGURE 8 is a front elevational view showing the front panel of a cabinet in which three counting units and a selector unit are installed.

FIGURE 9 is a front elevational view of a detecting mechanism and a portion of the tenths of gallon or cents display wheel of a gasoline pump.

FIGURE 10 is a side elevational view of the detecting mechanism shown in FIGURE 9.

FIGURE 11 is a front elevational view of the selector unit.

FIGURE 12 is a sectional view of the selector unit taken in line 5—5 in FIGURE 11.

FIGURE 13 is a side elevational view of the selector unit as viewed from the side opposite that near which the release solenoid is mounted.

FIGURE 14 is a sectional view of the selector unit taken in line 6—6 in FIGURE 12.

FIGURE 15 is a plan view of the catch plate of the selector unit.

FIGURE 16 is a side elevational view of the cut-off mechanism showing the cut-off solenoid mounted on the hose extension.

FIGURE 17 is a front elevational view of the cut-off mechanism shown in FIGURE 16 with the cable removed.

FIGURE 18 is a side elevational view of a conventional gasoline pump nozzle.

FIGURE 19 is a prospective view of the spring loaded reel mechanism showing the commutator rings on one side thereof.

FIGURE 20 is a schematic diagram showing the electrical relationship of the various mechanisms and components in the apparatus.

Figure 1:
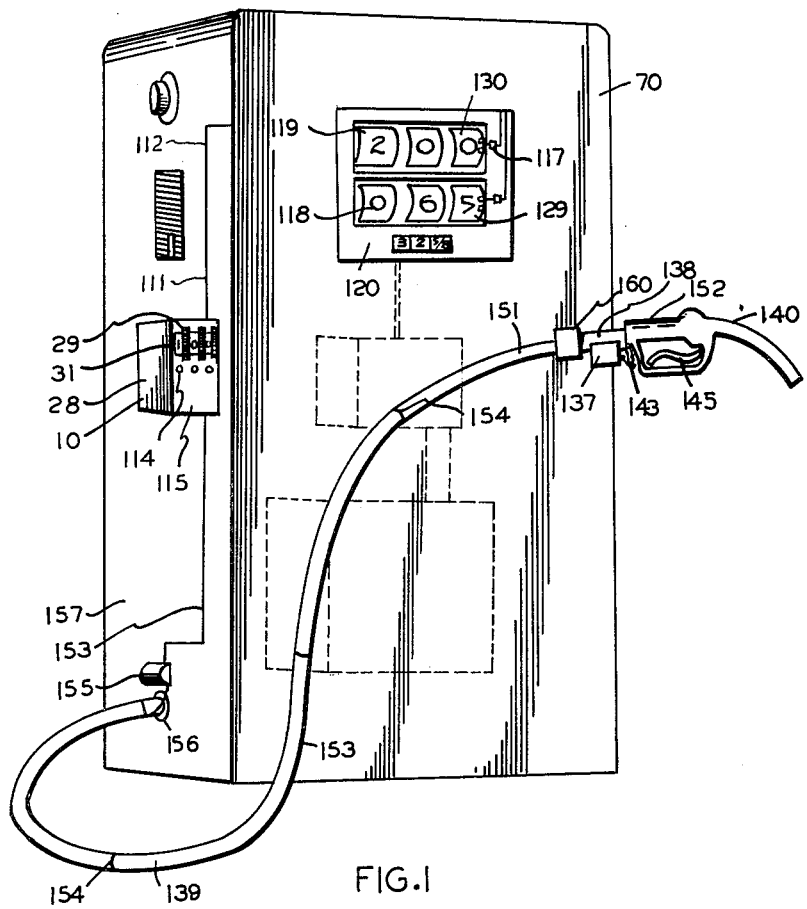
FIGURE 1 is a prospective view showing a conventional gasoline dispensing pump with counting, detecting, cut-off and other mechanisms described herein installed thereon.
Figure 2:
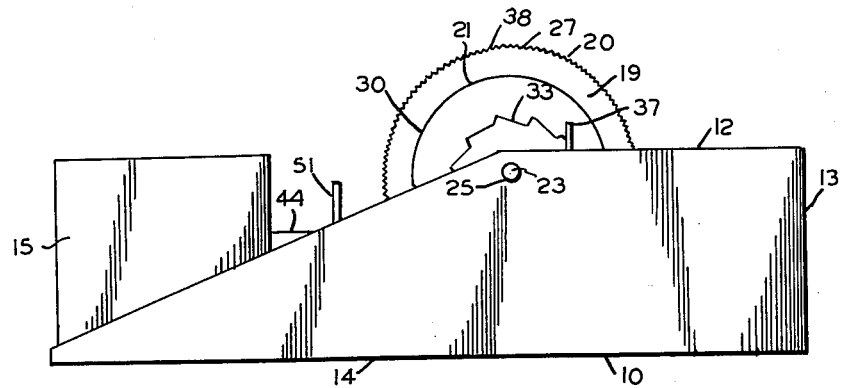
FIGURE 2 is a side elevational view of the counting unit.
Figure 3:
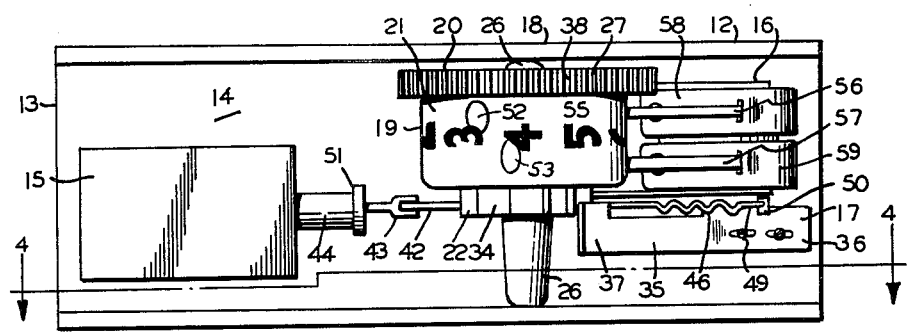
FIGURE 3 is a plan view of the counting unit as viewed looking down into the counting unit bracket.

These figures and the following detailed description disclose a preferred specific embodiment of this invention, but the invention is not limited to the details disclosed since it may be embodied in other equivalent forms.

The heart of the apparatus described herein is the counting mechanism 10 which is pre-set to indicate the amount of gasoline ordered by a customer and which counts the amount of gasoline delivered to the customer by a gasoline pump so that the pumping operation is discontinued when the amount ordered and the amount delivered coincide. This counting mechanism 10 consists of two basic units. One unit is the selector unit 11 and the other unit is the counting unit 12. Normally only one selector unit 11 is used in a counting mechanism 10. However, since each counting unit 12 accommodates only one digit indication, the number of counting units 12 used in a counting mechanism 10 depends upon the number of digits required to indicate the maximum amount which it is desired to count. For example, if it is desired to pre-set and count only up to or down from $9.99 or 99.9 gallons, three counting units 12 are sufficient since the number of digits in the indication of the amount counted never exceeds the three places made available by the three counting units 12. It should be noted that three counting units 12 are adequate for almost all service station uses since it would be most unusual for service station purchases to exceed $9.99 or 99.9 gallons.

Each counting unit 12 has a counting unit bracket 13 on the base 14 of which are mounted a counting solenoid 15, a micro-switch support 16 and a positioning spring 17 and between the sides 18 of which a counting wheel 19 is mounted. The counting wheel 19 has three component wheels, the positioning wheel 20, the indicating wheel 21 and the ratchet wheel 22. These three component wheels are mounted adjacent to each other on and concentric with an axle 23 passing through their centers 24 and through holes 25 in the counting unit bracket 13 and the position of the three adjacent component wheels 20, 21 and 22 along the length of the axle 23 is maintained by spacer cylinders 26 mounted on the axle 23 between the wheels 20 and 22 and adjacent sides 18 of the counting unit bracket 13. The three component wheels 20, 21 and 22 and spacer cylinders 26 can be made separately and assembled or the counting wheel 19 can be made as a single integral structure. Regardless of manufacturing method, all component wheels 20, 21 and 22 rotate together as a unit about the axle 23. Moreover, it should be noted that the spacer cylinders 26 can be eliminated and the counting wheel 19 composed of assembled component wheels 20, 21 and 22 or an integral counting wheel 19 structure positioned along the length of the axle 23 by set screws.

The positioning wheel 20 is the largest in diameter of the three component wheels and has a serrated peripheral surface 27 which, when the counting unit 12 is mounted in a cabinet 28, will extend through a slot 29 in the cabinet 28 to expose a portion of its peripheral surface 27. The indicating wheel 21 is the next largest in diameter of the component wheels and has the digits 0 to 9 evenly distributed around its circumference 30. The movement or position of these digits is viewed through a window 31 when the counting unit 12 is mounted in a cabinet 28. Smallest in diameter of the three component wheels is the ratchet wheel 22 which has ten ratchet teeth 32 evenly distributed about its circumference 33. It is the ratchet wheel 22 which cooperates with other components of the counting unit 12 to restrain the counting wheel 19 from freely rotating about the axle 23 while providing for the mechanical rotation of the counting wheel 19.

Resistance to rotation of the counting wheel 19 is accomplished by engaging the face 34 of a tooth 32 on the ratchet wheel 22 with the positioning spring 17. This positioning spring 17 is a strip of resilient material having a long spring segment 35 joining a base segment 36 by which the positioning spring 17 is attached to the base 14 of the counting unit bracket 13 and a ratchet segment 37 which is flush with the ratchet tooth face 34 it engages. The proper position of the base segment 36 of the positioning spring 17 on the base 14 of the counting unit bracket 13 is that which will hold the ratchet segment 37 against the face 34 of a ratchet wheel tooth 32 with tension in the spring segment 35.

It is this tension in the spring segment 35 when the positioning spring 17 is in proper position which tends to hold the counting wheel 19 in position against free or accidental rotation. However, the positioning spring 17 will yield to permit the counting wheel 19 to rotate in either direction when rotational force is applied.

The force to rotate the counting wheel can be applied either manually at the serrated periphery 27 of the positioning wheel 20 where the serrations 38 provide a high friction surface or mechanically at the ratchet wheel 22 by engaging the teeth 32 of the ratchet wheel 22 with a pawl 39. The pawl 39 used is at one end 40 of a pawl blade 41, the other end 42 of which is pivotably held in the forked end 43 of counting solenoid plunger 44 by a pin 45. The pawl blade 41 is positioned in the plane of the ratchet wheel 22 so that the pawl 39 will engage the teeth 32 of the ratchet wheel 22 when the pawl blade 41 moves toward the counting solenoid 15 by a pawl spring 46, one end 47 of which is secured to a hole 48 in the pawl end 40 of the pawl blade 41 and the other end 49 of which is secured to a tab 50 on the micro-switch support 16.

Resilient material is used for the pawl spring 46 and it is coiled for approximately that half of its length nearest the micro-switch support 16. The uncoiled length of the pawl spring 46 is straight and permits the pawl spring 46 to clear the spring segment 35 of the positioning spring 17 which in extending from the base 14 of the counting unit bracket 13 to the face 34 of the ratchet wheel teeth 32 intersects the line formed by the pawl spring 46, pawl blade 41 and counting solenoid plunger 44. Clearance between the positioning spring 17 and pawl spring 46 is further enhanced by offsetting the spring segment 35 of the positioning spring 17 slightly from the plane of the ratchet wheel 22 and extending the ratchet segment 37 to engage most of a ratchet tooth face 34 by making the ratchet segment 37 wider in the direction of the ratchet wheel 22 than the spring segment 35.

Figure 4:
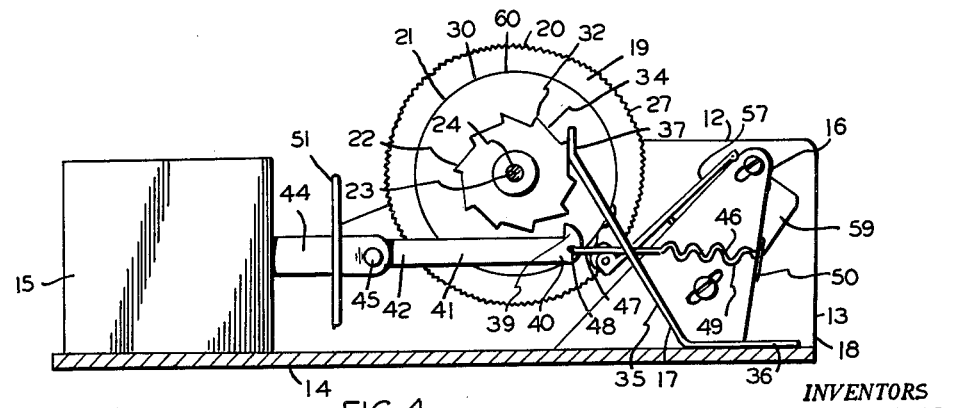
FIGURE 4 is a sectional view of the counting unit taken in line 4—4 in FIGURE 3, but with the raised areas rotated to engage one actuating lever.

When the pawl blade 41 is in the at rest position, as shown in FIGURE 4, the pawl 39 does not engage any portion of the counting wheel 19 and the counting wheel 19 can be manually rotated in either direction against the resistance of the positioning spring 17. However, when the pawl blade 41 is drawn toward the counting solenoid 15 by the action of the counting solenoid plunger 44 pulling on one end 42, the pawl 39 will engage a tooth 32 of the ratchet wheel 22 and will rotate the counting wheel 19 a sufficient number of degrees to advance the digits on the indicating wheel circumference 30 one position, the actual amount of rotation being controlled by the stop 51 on the plunger 44 of the counting solenoid 15. After each advance of the indicating wheel 21, the counting solenoid 15 is de-energized and the pawl blade 41 is pulled to the at rest position by the pawl spring 46.

In addition to digits 0 through 9, the indicating wheel 21 also carries two raised areas 52 and 53 on its circumference 30 which are laterally positioned on the indicating wheel surface 55 to move the actuating lever 56 or 57 associated with one, but not the other, of the two micro-switches 58 and 59 mounted in the micro-switch support 16. One raised area 52 is laterally located on the surface 55 of the indicating wheel 21 adjacent to the positioning wheel 20 and in this position will move the actuating lever 56 of the advancing micro-switch 58, which is the micro-switch most remote from the positioning spring 17. In addition, this same raised area 52 is located at that point on the circumference 30 of the indicating wheel 21 so that it will engage the advancing micro-switch 58 actuating lever 56 only when that portion of the indicating wheel surface 55 between 0 and 9 is being pulled past the indicating position 60 by the pawl 39 of the pawl blade 41. In the specific embodiment shown herein, the indicating position 60 for the digits of the counting wheel 19 is that position of the indicating wheel surface 55 most distant from the base 14 of the counting unit bracket 13.

The other raised area 53 on the indicating wheel surface 55 is laterally positioned on the surface 55 adjacent to the ratchet wheel 22 and will move only the actuating lever 57 of the output micro-switch 59, which is the micro-switch adjacent to the positioning spring 17. The position of this raised area 53 along the circumference 30 of the indicating wheel 21 is such that the raised area 53 will move its associated actuating lever 57 only when 0 is in the above defined indicating position 60 on the indicating wheel 21. Movement of the actuating lever 56 or 57 of either micro-switch 58 or 59 is accomplished by positioning the micro-switches 58 and 59 side by side in the micro-switch support 16 so that the roller 61 at the roller end 62 of each actuating lever 56 or 57 is in contact with the surface 55 of the indicating wheel 21. Constant roller 61 contact with the indicating wheel surface 55 is maintained by attaching the other end 63 of each actuating lever 56 or 57 to the top 64 of its micro-switch so that it will pivot about a pin 65. This pivoted end 63 is spring loaded in a conventional manner to pivot each actuating lever 56 or 57 away from the top 64 of its associated micro-switch 58 or 59 and against the surface 55 of the indicating wheel 21.

The switch contact 66 for operating the micro-switch is on the top of each micro-switch 58 or 59 beneath the actuating lever 56 or 57 for that micro-switch and is normally not depressed by the actuating lever as its roller end 62 rides on the indicating wheel surface 55. However, as the indicating wheel 21 rotates and a raised area 52 or 53 is engaged by the roller 61 of the actuating lever, the actuating lever 56 or 57 moves against the force of the spring at its pivot end 63 and toward the top 64 of the micro-switch. This movement will, of course, force the actuating lever 56 or 57 against the switch contact 66 and operate the micro-switch 58 or 59 which can return to its original condition only after the raised area 52 or 53 on the indicating wheel surface 55 has rotated past the roller 61 on the actuating lever.

From the foregoing, it can be seen that each time the counting solenoid 15 of the counting unit 12 is energized, the counting solenoid plunger 44 is pulled into the counting solenoid 15 a distance limited by the stop 51 on the plunger 44 and that this plunger movement results in the pawl blade 41 being drawn a distance sufficient to engage a tooth 32 of the ratchet wheel 22 and rotate the counting wheel 19 a distance sufficient to move the digits of the indicating wheel 21 one position. In the counting unit 12 described herein the digits are sequenced on the surface 55 of the indicating wheel 21 so that each change in position results in a lower number being rotated into the indicating position 60, except when the transition from 0 to 9 is made once with each complete revolution of the counting wheel 19. Thus, in continuous operation, the counting wheel 19 initially counts from the digit initially set in the indicating position 60 to zero and then repeatedly from 9 to 0 until counting is discontinued.

In addition, each time the indicating wheel surface 55 between 0 and 9 moves past the indicating position 60, the advancing micro-switch 58 actuated by the raised area 52 on the indicating wheel surface 55 adjacent to the positioning wheel 20 is momentarily operated and each time the digit 0 on the indicating wheel surface 55 comes to rest in the indicating position 60, the output micro-switch 59 actuated by the raised area 53 on the indicating wheel surface 55 adjacent to the ratchet wheel 22 is operated and remains in operated condition until the 0 digit moves away from the indicating position 60. The operating of the advancing micro-switch 58 each time the indicating wheel surface 55 moves from 0 to 9 indication is used to close and energize a circuit 67 to the counting solenoid 68 of a second and identical counting unit 12, which therefore advances one digit position each time the indicating wheel surface 55 between the 0 and 9 of the first counting unit 12 passes the indicating position 60. The second counting unit 12 energizes and advances a third counting unit 12 in identical fashion. Thus, three counting units 12 form a counting assembly capable of counting by units from a presentation of 999 to a presentation of 000.

The output micro-switches 59 actuated by each counting wheel 19 when the 0 digit of the counting wheel 19 is in the indicating position 60 are connected in series in an electrical circuit 69 which is completed only when all counting wheels 19 have the digit 0 in the indicating position 60. Thus, when the counting assembly attains a 000 indicating position, an electrical circuit 69 is completed which discontinues the counting operation and in the specific embodiment of the invention described herein discontinues the pumping operation of a gasoline dispenser stand 70. However, it should be noted that since a counting assembly of counting units 12 is as capable of counting up as it is capable of counting down, since the number of counting units 12 linked in a counting assembly is essentially unlimited, and since the number of raised areas 52 or 53 on an indicating wheel surface 55 and the number of micro-switches 58 or 59 arranged about the periphery of an indicating wheel 21 may exceed the two used with the apparatus described herein, the counting assembly is readily adaptable to a wide variety of applications.

As described herein, the counting assembly of three counting units 12 is used to count down from a pre-determined amount of gasoline in terms of dollars up to $9.99 or in terms of volume up to 99.9 gallons. Since the counting wheels 19 can be manually and independently rotated in either direction, the counting wheels 19 are rotated independently in either direction and in a most convenient manner to the pre-determined presentation of dollars or gallons desired. The same counting assembly presentation is used whether it is desired to count cost or volume and it is by selecting the input source to the counting solenoid 15 of the first counting unit 12 that the choice is made between counting cost or volume of gasoline delivered. This selection of input source is accomplished by the selector unit 11 of the counting mechanism 10 which is comprised of a U-shaped support 71 having wing-like flanges 72 at each end, a top panel 73 positioned across the U-shaped support 71 and at its ends 74 flush with the wing-like flanges 72, and a release solenoid 75 mounted on one wing-like flange 72 adjacent to one side 76 of the U-shaped support 71.

The U-shaped support 71 and the top panel 73 form a cavity in which are mounted three selector micro-switches 77, 78 and 79, each having an actuating arm 80 pivoted on its top 64 to engage its switch contact 66 and extending into the cavity toward three plungers 81, 82 and 83. The three plungers are positioned in the cavity by passing through slots in the top panel and slots 85 in the bottom 86 of the U-shaped support 71. The side 76 of the U-shaped support 71 adjacent to the release solenoid 75 has a rectangular cutout in which is positioned a door 87 having a tab 88 at its bottom and hinge 89 at its top by which the door 87 is hinged to the side 76 of the U-shaped support 71 adjacent to the top panel 73. The tab 88 of the door extends below the bottom 86 of the U-shaped support 71 and passes through a slot 90 in a catch plate 91 which is slidably attached to and beneath the bottom 86 of the U-shaped support 71 by bolts 92 passing through holes in the U-shaped support bottom 86 and through elongated holes 94 in the slidable catch plate 91.

It can be seen that the elongated holes 94 in the catch plate 91 permit the catch plate 91 to be moved by the tab 88 of the door 87 and that when the door 87 and its tab 88 are rotated about the hinge 89, the catch plate 91 moves in the same direction as the tab 88. The three plungers 81, 82 and 83 already described not only extend through slots 85 in the bottom 86 of the U-shaped support 71, but they also extend through three elongated slots 95 in the catch plate 91. Moreover, all three plungers 81, 82 and 83 have sloping tabs 96 and 97 arranged to increase their width in that plunger portion which is normally just above the bottom 86 of the U-shaped support 71 as shown in FIGURE 11. The slots 85 and 95 in both the bottom 86 of the U-shaped support 71 and in the catch plate 91 through which the plungers 81, 82 and 83 pass are sufficiently long to permit the two switching plungers 81 and 82 as widened by their tabs 96 to slide, when depressed, through the bottom 86 of the U-shaped support 71 and the catch plate 91 until the top edges 98 of the tabs 96 are beneath the catch plate 91. Further depression of these two switching plungers 81 and 82 is prevented by stops 99 extending from these plungers 81 and 82 which strike the bottom 86 of the U-shaped support 71 when the plungers 81 and 82 are sufficiently depressed.

The door 87 and its tab 88 are pulled toward the side 76 of the U-shaped support 71 opposite their position by a catch spring 100, one end 101 of which is attached to the door 87 and the other end 102 of which is attached to the side 76 of the U-shaped support 71 opposite the door 87. As a result, the depression of the plungers 81, 82 and 83 through the catch plate slots 95 is resisted by this catch spring 100 since the tabs 96 and 97 must force the catch plate 91 toward the door 87 in order to pass. Moreover, as soon as the plunger tabs 96 have passed below the catch plate 91, the catch spring 100 draws the door 87, tab 88 and catch plate 91 toward the side 76 of the U-shaped support 71 opposite the door 87 and the depressed plunger 81 or 82 is prevented from returning to normal position by the top edge 98 of the tab 96 engaging the catch plate 91. This normal position as shown in FIGURE 11 is a position toward which all three plungers 81, 82 and 83 are urged by reset springs 103 passing through a hole 104 in the bottom ends 105 of the plungers 81, 82 and 83 and secured to the bottom 86 of the U-shaped support 71 by three screws 106.

From the foregoing, it is apparent that two of the plungers 81 and 82 described above, when depressed, will remain depressed until the catch plate 91 is moved toward the door 87 to clear their tabs 96 and permit the reset springs 103 to raise the plungers 81 and 82 through the elongated slots 95 of the catch plate 91 to normal position. Movement of the catch plate 91 in this direction can be accomplished in two ways. The first way is by depressing the third or release plunger 83 which has a tab 97 similar to that tab 96 on the other two plungers 81 and 82, but which is too wide to pass through the slots 85 in the bottom 86 of the U-shaped support 71 and the slots 95 in the catch plate 91. Thus, this release plunger 83, when depressed, will force the catch plate 91 in the direction of the door 87 and release any of the other plungers 81 or 82 which happen to be depressed, but will not remain depressed itself. The release solenoid 75, which is mounted adjacent to the door 87 on the wing-like flange 72 by a bracket 107, provides the second way of moving the catch plate 91. When this release solenoid 75 is energized, it attracts the door 87 and moves the door 87, its tab 88, and the catch plate 91 in the same direction as the release plunger 83 moves them. Thus, energizing the release solenoid 75 will also release any plunger 81 or 82 which is depressed. As already indicated, the release of a plunger 81 or 82 in either of the foregoing ways will result in the reset spring 103 forcing the plunger plunger 81 or 82 to its normal position as shown in FIGURE 11.

The two plungers 81 and 82, which are capable of being depressed and held in depressed position by the catch plate 91, have two arms 108 and 109 extending from opposite sides at points which are just below the top panel 73 when the plungers 81 and 82 are in normal position. When these plungers 81 and 82 are depressed, the two arms of one plunger 81 respectively engage the actuating arms 80 of two of the three selector micro-switches 77 and 79 and one arm 108 of the other plunger 82 engages the actuating arm 80 of one of the selector micro-switches 79 engaged by first plunger and the other arm 109 engages the actuating arm 80 of the selector micro-switch 78 not engaged by the first plunger. These three micro-switches 77, 78 and 79 are mounted in the cavity of the U-shaped support 71 and have spacers 110 between them in order to position them so that their actuating arms 80 are properly engaged by the arms 108 and 109 of the plungers 81 and 82.

In the specific embodiment of the invention described herein, the selector micro-switch actuating arm 80 which is engaged by the arms 108 and 109 of both plungers 81 and 82 is associated with the selector micro-switch 79 in the on-off circuit 111 of the apparatus and the two selector micro-switches 77 and 78 having actuating arms 80 associated with the arm 108 or 109 of only one of the two plungers 81 and 82 are respectively in the volume input circuit 112 and dollar input circuit 113 to the counting solenoid 15 of the first counting unit 12. The tops 114 of all three plungers 81, 82 and 83 extend as shown in FIGURE 8 through the front panel 115 of a cabinet 28 in which a selector unit 11 and counting units 12 of a counting mechanism 10 are mounted. Thus, when it is desired to make the counting mechanism 10 respond to gallons of gasoline delivered, the plunger 82 is depressed which actuates the on-off circuit selector micro-switch 79 and the selector micro-switch 77 in the circuit 112 between the counting mechanism 10 and the means used to detect the gallons of gasoline being delivered by the gasoline pump. Similarly, when it is desired to make the counting mechanism respond to cost of gasoline delivered, the second plunger 82 is depressed to actuate the same on-off selector micro-switch 79 and the selector micro-switch 78 which is in the circuit 113 between the counting mechanism 10 and the means used to detect the cost of the gasoline being delivered by the gasoline pump.

From the structure already described, it is evident that if an error has been made or if it is desired to manually deactivate the apparatus, it is simply necessary to depress the release plunger 83 to cause the catch plate 91 to release whichever plunger 81 or 82 has been previously depressed and open all circuits associated with the apparatus. Moreover, when the release solenoid 83 is energized by a circuit 69 which contains in series the output micro-switches 59 operated when 0 is in the indicating position 60 of the counting wheels 19, 000 indication of the counting mechanism 10 causes the release solenoid 75 to be energized and will open all circuits in the way described above. In order that this same circuit 69 can be used to energize means for cutting off the gasoline pump, a time delay feature 116 has been added to the circuit 69 which delays opening all circuits for the time period necessary to deactivate the gasoline pump.

Thus, the counting mechanism 10 may be described as an assembly of counting units 12 capable of being set to any predetermined amount and which will count by cents or by tenths of gallons, depending upon the input to the counting mechanism 10, until this pre-determined amount of gasoline or other material has been delivered. In performing this function, the counting mechanism 10 provides for conveniently selecting whether the counting mechanism 10 is actuated by gallons or cost of gasoline, for manual correction or deactivation of the counting mechanism 10 and other components, and for a controlled electrical output which will deactivate a gasoline pump 70 or any other device to which it is connected and which after a pre-determined delay will deactivate the counting mechanism 10 and other associated mechanisms or components.

In the specific embodiment of the invention described herein, the input to the counting mechanism 10 is provided by two detecting mechanisms 117, one associated with the gallons of gasoline delivered display device 118 in the face 120 of a gasoline dispenser stand 70 and the other associated with the cost of gasoline delivered display device 119 in the face 120 of a gasoline dispenser stand 70. The detecting mechanisms 117 are identical, each having a detecting micro-switch 121 mounted on a bracket base 122 which has an elongated hole 123 at each of its two tab ends 124 through which a screw is inserted to fasten the bracket base 122 and detecting micro-switch 121 to the face 120 of a gasoline dispenser stand 70 adjacent to a gasoline pump display device 118 or 119 as shown in FIGURES 1 and 9. Secured to the detecting micro-switch 121 with screws 126 is an actuating arm 127 positioned to operate the detecting micro-switch 121 by depressing and releasing the switch contact 66 of the detecting micro-switch 121 in response to the motion of a probe 128 fixedly attached to the actuating arm 127. The probe 128 extends from the actuating arm 127 toward the cents or tenths of gallon wheel 129 or 130 of the gasoline pump display devices 118 and 119 and its free end 131 is bent to ride along the edge or side 132 of the particular pump display wheel 129 or 130 with which it is associated.

The probe 128 carries a shield 133 which rides on the face 134 of the pump display wheel 129 or 130 adjacent to the edge 132 of the pump display wheel 129 or 130 and assists in maintaining probe contact with the edge 132. As the probe 128 rides along the side 132 of the gasoline pump display wheel 129 or 130, it forces the actuating arm 127 toward the detecting micro-switch 121 and depresses the switch contact 66. However, the side 132 of the gasoline pump display wheel 129 or 130 against which the probe 128 rides has notches 135 positioned half-way between the numbers on the display wheel 129 or 130 and the actuating arm 127 to which the probe 128 is attached has sufficient resiliency to force the probe 128 into these notches 135 as the gasoline pump display wheel 129 or 130 revolves. When the actuating arm 127 forces the probe 128 into a notch 135, the actuating arm 127 moves away from the detecting micro-switch 121 and releases the switch contact 66 while a notch 135 passes the probe 128.

Since the detecting micro-switch 121 is arranged to close a circuit only when the switch contact 66 is released, it can be seen that a circuit 112 or 113 wired through the detecting micro-switch 121 will be periodically closed each time the probe 128 encounters a notch 135 on a display wheel 129 or 130 of a gasoline dispenser stand 70. It is this periodic closing of a circuit 112 or 113 passing through the detecting micro-switch 121, a selector micro-switch 77 or 78 and the counting solenoid 15 of the first counting unit 12 which is used to energize the counting mechanism 10 and advance the counting mechanism 10 one unit for each unit of motion of the gasoline pump display wheel 129 or 130. Whether the counting mechanism 10 advances in response to tenths of gallons or cents as gasoline is delivered depends upon the particular gasoline pump display wheel 129 or 130 associated with the detecting mechanism 117 to which the counting solenoid 15 of the first counting unit 12 is connected by the selector unit 11 in the manner already described.

It should be noted that the probe 128 engages a notch 135 on a gasoline pump display wheel 129 or 130 slightly before the notch 135 reaches that position at which a number is centered at the mid display point 136 of the display wheel 129 or 130. This displacement or advancing of the probe 128 is to provide for any time lag in the operation of the apparatus in responding to the motion of the gasoloine pump display wheels 129 and 130. The exact amount of displacement will depend upon the speed with which the gasoline pump display wheels 129 and 130 revolve. Although exact probe 128 locations are empirically established for the particular gasoline dispenser stand 70 to which the apparatus is attached, changes in the speed of dispensing gasoline are readily accommodated by using the elongated holes 123 in the tabs 124 of the bracket base 122 to shift the position of the probe 128.

In the specific embodiment described herein, the discontinuing of gasoline pumping operations when a predetermined amount of gasoline, by volume or cost, has been delivered is accomplished by using a cut-off solenoid 137 energized by a circuit 69 which passes in series through the counting mechanism 10 output micro-switches 59, all of which are closed only when the counting mechanism 10 indicates 000. This cut-off solenoid 137 is mounted on a hose extension 138 which is inserted between the conventional flexible hose 139 and nozzle 140. The cut-off solenoid 137 has a flexible cable 141 attached to the end to its plunger 142. This flexible cable 141 is attached at its end remote from cut-off solenoid plunger 137 to the free end 143 of the trigger locking device 144 commonly found on present day gasoline pump nozzles 140. These trigger locking devices 144 lock a gasoline pump nozzle trigger 145 in operating condition by pivoting from the nozzle body 146 to catch the free end 147 of the trigger 145 in a notch 148 and they release the trigger 145 and discontinue pumping when pivoted toward the cut-off solenoid 137.

Thus, when the cut-off solenoid 137 is energized and the plunger 142, cable 141 and trigger locking device end 143 are pulled toward the cut-off solenoid 137, the trigger 145 on the gasoline pump nozzle 140 is released and the pumping of gasoline discontinued. It should be noted that this method for discontinuing the pumping of gasoline by a gasoline dispenser stand 70 is particularly advantageous since it does not deactivate the gasoline pump's internal mechanism and permits the attendant to return to the dispenser stand 70 and deliver additional gasoline by simply depressing the trigger 145 of the nozzle 140 again. Moreover, the hose extension 138 is easily installed on existing gasoline dispenser stands 70 since at one end 149 it is threaded in exactly the same manner as the end 151 of a conventional hose 139 and at the other end 150 it is threaded in exactly the same manner as the end 152 of a conventional nozzle 140. Therefore, the hose extension 138 is simply inserted between a hose 139 and a nozzle 140.

The wire leads 153 to the cut-off solenoid 137 are strapped to the hose 139 at frequent intervals by short lengths of wire or by clamps 154. In addition, for those gasoline pumps 70 having a hose 139 a length of which is withdrawn for use from the interior of the dispenser stand 70, a reel 155 is mounted adjacent to the hose aperture 156 in the pump housing 157. This reel 155 is spring loaded in the conventional manner to shorten or lengthen the wire leads 153 as required and has commutator rings 158 on one side 159 to provide for a continuous electrical connection between the counting mechanism 10 and the cut-off mechanism 160, although the reel 155 is revolving. Thus, the reel 155 provides a connection to the cut-off solenoid 137 which can be extended by the length necessary to accommodate the increased length of the hose 139 as it is withdrawn from the interior of the gasoline dispenser stand 70.

The schematic diagram shown in FIGURE 20 provides a convenient means for summarizing the operation of the apparatus described herein. Assuming that a filling station customer desires to purchase $2.50 worth of gasoline, the two left counting wheels 19 of the three counting wheels 19 in the counting mechanism 10 are manually rotated in either direction until 250 is displayed in the window 31 of the cabinet 28. This is accomplished by using the serrated circumferences 27 of their component positioning wheels 20. Further assuming that the detecting micro-switch 121 is in the detecting mechanism 117 associated with the cost display wheel 130 of the gasoline pump, the selector unit plunger 82 which closes the selector micro-switch 78 in the same circuit 113 with this detecting micro-switch 121 is then depressed. This plunger 82 is held in depressed position by the catch plate 91 of the selector unit 11 as explained herein and in addition closes the selector micro-switch 79 in the on-off circuit 111 to energize the entire apparatus.

The apparatus is now ready for operation and the dispensing of gasoline is started by operating the trigger 145 of the gasoline pump nozzle 140 and locking the trigger 145 in operating position with the trigger locking device 144 as if the customer's automobile gasoline tank were to be pumped to full condition. As the cents display wheel 130 on the gasoline pump display 119 rotates from 0 to 1, the probe 128 of the detecting mechanism 117 drops into the notch 135 in the edge 132 of the pump display wheel 130 between numbers 0 and 1 and the detecting micro-switch 121 is momentarily closed. As a result, a circuit 113 is completed through the counting solenoid 15 of the first counting unit 12 of the counting mechanism 10 and the pawl 39 of the pawl blade 441 of this counting unit 12 engages the ratchet wheel 22 and rotates 0 out of and 9 into the indicating position 60.

This rotation of the counting wheel 19 of the first counting unit 12 causes a raised area 52 on the indicating wheel 21 to pass under the roller 61 of the actuating lever 56 of the advancing micro-switch 58. Therefore, the advancing micro-switch 58 is momentarily closed and a circuit 67 momentarily completed to the counting solenoid 68 of the second counting unit 12 and the digit indicated by the second counting unit 12 is changed from 5 to 4. Thus, as the gasoline pump display 119 moves from $0.00 to $0.01, the counting mechanism 10 indication changes from 250 to 249.

The counting mechanism 10 continues to follow the gasoline pump display wheel 130 in this manner until 000 is indicated by the counting mechanism 10 and $2.50 is displayed by the gasoline pump display 119. At this moment, a raised area 53 on the indicating wheels 21 of all three counting units 12 causes actuating levers 57 to close the output micro-switches 59 in all three counting units 12. These output micro-switches 59 are in series and when they are all closed, they complete a circuit 69 through the cut-off solenoid 137 which acts to disengage the trigger locking device 144 and stop the dispensing of gasoline.

As described herein, the small time lag in the operation of the apparatus is compensated for by advancing or displacing the position of probe 128 of the detecting mechanism 117 so that the probe 128 engages the notch 135 between numbers on the pump display wheel 130 just before a number reaches the mid display position 136 of the display wheel 130. Thus, the apparatus is actuated slightly before a number on the pump display wheel 130 reaches the mid display position 136 and the apparatus has completed all functions, including timely gasoline pump cut-off, by the time the display wheel 130 number reaches mid display position 136. This compensation can also be accomplished by positioning the notch 135 on the edge 132 of the pump display wheel 130 at other than the mid point between the numbers on the display wheel 130, but this method does not provide the flexibility obtainable by moving the detecting mechanism 117.

The same circuit 69 through the three output micro-switches 59 which passes through the cut-off solenoid 137 also passes through a time delay element 116 and after this circuit 69 has been energized for the short time necessary for the cut-off solenoid 137 to function, this time delay element 116 closes the circuit 69 through the release solenoid 75 which results in the catch plate 91 of the selector unit 11 releasing the depressed plunger 82 and the entire apparatus becoming inactive. Thus, the service station attendant may return to the gasoline pump and use it in the usual manner without interference from the apparatus. Moreover, it should be again noted that the apparatus can be deactivated at any time simply by pressing the release plunger 83. In addition, it should be noted that the many unique features of the counting mechanism 10 can be readily used with a variety of detecting 117 or input mechanisms and a variety of cut-off 160 or output mechanisms. For example, although lacking many advantages found in the total apparatus described herein, gasoline pump performance can be detected by a proble or device associated with the internal mechanism of the pump and gasoline pump cut-off can be achieved electrically or mechanically in a similar manner.

Finally, it should be noted that in the specific embodiment described herein, a modified counting unit 12 can be used for the left-hand digit in the conventional number indication since this particular counting unit 12 does not advance another counting unit 12. Thus, this particular counting unit 12 does not require an advancing micro-switch 58 or the actuating lever 56 and raised area 52 normally associated with it.

What is claimed is:

In a fluid dispensing apparatus, including a pump, a flowmeter to measure the volume of fluid that flows through said pump, a dispensing hose, a nozzle on said dispensing hose, said nozzle having a valve operated by a trigger and means for locking said trigger so that said valve remains open, a first counting wheel to indicate the volume of fluid that has flowed through said flowmeter and a second counting wheel to indicate the monetary value of the fluid that has flowed through said flowmeter, the combination therewith of a first sensing switch adjacent said first counting wheel, a second sensing switch adjacent said second counting wheel, means on said first counting wheel to close said first sensing switch at each predetermined incremental change in indication of said first counting wheel, means on said second counting wheel to close said second sensing switch at each predetermined incremental change in indication of said second counting wheel, an electrical circuit associated with said sensing switches, selector means for determining which of said sensing switches will be connected in said circuit, the arrangement being such that there will be an electrical impulse in said circuit each time said sensing switches are closed, counting means for counting said impluses, said counting means including a solenoid connected in said circuit in series with said sensing switches, a third counting wheel arranged to be rotated a predetermined amount by said solenoid, switch means associated with said third counting wheel and arranged to be closed on each complete rotation of said third counting wheel, a lock releasing solenoid arranged to release said means for locking said trigger so that said valve remains open, said lock releasing solenoid being in parallel with said circuit and in series with said switch means associated with said third counting wheel, said selector means including a pair of selector switches, one of said selector switches being in series with each of said sensing switches, and mechanical means for determining which of said selector switches will be closed.

References Cited in the file of this patent

UNITED STATES PATENTS

| | | |
|---|---|---|
| 2,643,792 | Daley et al. | June 30, 1953 |
| 2,713,971 | Bud et al. | July 26, 1955 |
| 2,759,633 | Ross | Aug. 21, 1956 |
| 2,784,874 | Harper | Mar. 12, 1957 |
| 2,787,677 | Seaman | Apr. 2, 1957 |
| 2,804,991 | Burleyson | Sept. 3, 1957 |
| 2,855,478 | Schneider et al. | Oct. 7, 1958 |
| 2,895,021 | Mekelbury | July 14, 1959 |
| 2,916,566 | Meyer et al. | Dec. 8, 1959 |
| 2,936,096 | Shawhan | May 10, 1960 |
| 2,981,469 | Gelling | Apr. 25, 1961 |
| 3,011,033 | Belicka et al. | Nov. 28, 1961 |
| 3,040,139 | Appleton | June 19, 1962 |